(12) United States Patent
Rankin et al.

(10) Patent No.: US 10,806,954 B2
(45) Date of Patent: Oct. 20, 2020

(54) FILTER MEDIA FOR RESPIRATORY PROTECTION

(71) Applicant: 3M INNOVATIVE PROPERTIES COMPANY, St. Paul, MN (US)

(72) Inventors: Matthew A. Rankin, Brockville (CA); Jeffrey R. Dahn, Halifax (CA); Xiaowei Ma, Halifax (CA)

(73) Assignee: 3M Innovative Properties Company, St. Paul, MN (US)

( * ) Notice: Subject to any disclaimer, the term of this patent is extended or adjusted under 35 U.S.C. 154(b) by 305 days.

(21) Appl. No.: 15/749,820

(22) PCT Filed: Aug. 4, 2016

(86) PCT No.: PCT/US2016/045514
§ 371 (c)(1),
(2) Date: Feb. 2, 2018

(87) PCT Pub. No.: WO2017/024116
PCT Pub. Date: Feb. 7, 2017

(65) Prior Publication Data
US 2018/0221692 A1    Aug. 9, 2018

Related U.S. Application Data

(60) Provisional application No. 62/201,691, filed on Aug. 6, 2015.

(51) Int. Cl.
*B01J 20/06* (2006.01)
*C01G 45/02* (2006.01)
(Continued)

(52) U.S. Cl.
CPC .............. *A62B 23/02* (2013.01); *A62B 19/00* (2013.01); *B01D 53/02* (2013.01);
(Continued)

(58) Field of Classification Search
CPC ................................ A62B 23/02; A62B 19/00
See application file for complete search history.

(56) References Cited

U.S. PATENT DOCUMENTS

| 3,671,606 | A | 6/1972 | Manning |
| 4,832,926 | A | 5/1989 | Schillaci |

(Continued)

FOREIGN PATENT DOCUMENTS

| RU | 2154525 | 8/2000 |
| RU | 2221627 | 1/2004 |

(Continued)

OTHER PUBLICATIONS

Zhu Shu et. al., Room-temperature catalytic removal of low-concentration NO over mesoporous Fe—Mn binary oxide synthesized using a template-free approach, Apr. 26, 2013, Applied Catalysis B: Environmental 140-141 (2013) p. 42-50 (Year: 2013).*

(Continued)

*Primary Examiner* — Robert Clemente
*Assistant Examiner* — Abhinav Garg
(74) *Attorney, Agent, or Firm* — Steven A. Bern; Dena M. Ehrich (57) ABSTRACT

A respiratory protection filter includes filtration media. The filtration media includes an iron-doped manganese oxide material having an average pore size (BJH method) in a range from 1 to 4 nm and a surface area (BET) of at least 300 $m^2/g$, or at least 350 $m^2/g$, or at least 400 $m^2/g$.

10 Claims, 2 Drawing Sheets

(51) Int. Cl.
| | |
|---|---|
| *B01D 53/02* | (2006.01) |
| *B01J 20/28* | (2006.01) |
| *A62B 23/02* | (2006.01) |
| *A62B 19/00* | (2006.01) |
| *B01J 20/30* | (2006.01) |
| *B01J 20/02* | (2006.01) |
| *B01D 53/04* | (2006.01) |

(52) U.S. Cl.
CPC ........... *B01J 20/0229* (2013.01); *B01J 20/06* (2013.01); *B01J 20/28* (2013.01); *B01J 20/2808* (2013.01); *B01J 20/28057* (2013.01); *B01J 20/28061* (2013.01); *B01J 20/28078* (2013.01); *B01J 20/28083* (2013.01); *B01J 20/3007* (2013.01); *B01J 20/3021* (2013.01); *B01J 20/3028* (2013.01); *B01J 20/3035* (2013.01); *B01J 20/3085* (2013.01); *C01G 45/02* (2013.01); *B01D 53/0415* (2013.01); *B01D 2253/1124* (2013.01); *B01D 2253/25* (2013.01); *B01D 2253/306* (2013.01); *B01D 2253/308* (2013.01); *B01D 2257/302* (2013.01); *B01D 2257/406* (2013.01); *B01D 2257/704* (2013.01); *B01D 2257/708* (2013.01); *B01D 2258/06* (2013.01); *B01D 2259/4541* (2013.01); *B01J 2220/42* (2013.01); *C01P 2006/10* (2013.01); *C01P 2006/12* (2013.01); *C01P 2006/14* (2013.01); *C01P 2006/16* (2013.01)

(56) References Cited

U.S. PATENT DOCUMENTS

| | | | |
|---|---|---|---|
| 5,578,282 | A | 11/1996 | O'Young |
| 5,702,674 | A | 12/1997 | O'Young |
| 6,464,752 | B1 | 10/2002 | Roth |
| 6,503,476 | B1 | 1/2003 | Suib |
| 6,610,263 | B2 | 8/2003 | Pahlman |
| 6,677,081 | B2 | 1/2004 | Sunagawa |
| 6,855,297 | B2 | 2/2005 | Van Den Bussche |
| 7,041,270 | B2 | 5/2006 | Hammel |
| 7,232,782 | B2 | 1/2007 | Hammel |
| 7,247,279 | B2 | 7/2007 | Pahlman |
| 7,419,637 | B2 | 9/2008 | Boren |
| 7,488,464 | B2 | 2/2009 | Hammel |
| 7,655,148 | B2 | 2/2010 | Chen |
| 8,216,543 | B2 | 7/2012 | Chen |
| 8,697,019 | B2 | 4/2014 | Chen |
| 2003/0135082 | A1 | 7/2003 | Cao |
| 2004/0101457 | A1* | 5/2004 | Pahlman ................. B01J 20/06 423/50 |
| 2004/0106517 | A1 | 6/2004 | Dlamini |
| 2004/0152791 | A1 | 8/2004 | Zyl |
| 2005/0074380 | A1* | 4/2005 | Boren ..................... B01J 19/006 423/1 |
| 2007/0086935 | A1 | 4/2007 | Chen |
| 2008/0156194 | A1 | 7/2008 | Withiam |
| 2010/0059428 | A1 | 3/2010 | Boren |
| 2011/0086270 | A1 | 4/2011 | Amos |
| 2012/0024799 | A1* | 2/2012 | Chen .................... B01J 20/0222 210/749 |
| 2012/0103907 | A1* | 5/2012 | MacKinnon ........... B01D 53/64 210/660 |
| 2012/0111335 | A1 | 5/2012 | Croll |
| 2012/0245236 | A1 | 9/2012 | Suib |
| 2014/0255283 | A1* | 9/2014 | Sidheswaran ........... B01J 23/34 423/245.1 |
| 2014/0296062 | A1* | 10/2014 | Suib ....................... B01J 23/745 502/300 |
| 2015/0125352 | A1 | 5/2015 | Hirooka |

FOREIGN PATENT DOCUMENTS

| | | |
|---|---|---|
| WO | WO 2005/005020 | 1/2005 |
| WO | WO 2009/105406 | 8/2009 |
| WO | WO 2014/141198 | 9/2014 |

OTHER PUBLICATIONS

Wenxiang Tang et. al., "Oxalate route for promoting activity of manganese oxide catalysts in total VOCs' oxidation: effect of calcination temperature and preparation method," (2014), Journal of Materials Chemistry A, pp. 2544-2554 (Year: 2014).*

Barrett, "The Determination of Pore Volume and Area Distributions in Porous Substances. I. Computations from Nitrogen Isotherms", Journal of American Chemical Society, Jan. 1951, vol. 73, No. 1, pp. 373-380.

Chen, "Low-Temperature Selective Catalytic Reduction of $NO_x$ with $NH_3$ over Fe—Mn Mixed-Oxide Catalysts Containing $Fe_3Mn_3O_8$ Phase", Industrial & Engineering Chemistry Research, 2012, vol. 51, No. 1, pp. 201-212.

Chen, "Nanofibrous Manganese Dioxide for Decomposition of Volatile Organic Compounds", Materials Research Society Symposium Proceedings, 2004, vol. 800, pp. 373-386.

Chen, "Reducing dissolution of $MnO_2$ nanofibers by doping with ferric ion", Science and Technology Advanced Materials, 2007, vol. 8, No. 1-2, pp. 63-66.

Coradin, "Iron Manganites Synthesis by the Soft Chemistry Method", Materials Research Society Symposium Proceedings, 2001, vol. 674, pp. T3.5.1-T3.5.6.

Cui, "Fabrication of magnetic porous Fe—Mn binary oxide nanowires with superior capability for removal of As(III) from water", Journal of Hazardous Materials, 2014, vol. 279, pp. 26-31.

Diodati, "Green and low temperature synthesis of nanocrystalline transition metal ferrites by simple wet chemistry routes", Nano Research, Jul. 2014, vol. 7, No. 7, pp. 1027-1042.

Fang, "Supercapacitive properties of ultra-fine $MnO_2$ prepared by a solid-state coordination reaction", Journal of Alloys and Compounds, Oct. 2010, vol. 507, No. 2, pp. 526-530.

Fortier, "Ammonia, cyclohexane, nitrogen and water adsorption capacities of an activated carbon impregnated with increasing amounts of $ZnCl_2$, and designed to chemisorb gaseous $NH_3$ from an air stream", Journal of Colloid and Interface Science, Apr. 2008, vol. 320, No. 2, pp. 423-435.

Fortier, "$SO_2$ adsorption capacity of $K_2CO_3$-impregnated activated carbon as a function of $K_2CO_3$ content loaded by soaking and incipient wetness", Applied Surface Science, Jan. 2007, vol. 253, No. 6, pp. 3201-3207.

Guillemet-Fritsch, "Structure of Highly Divided Nonstoichiometric Iron Manganese Oxide Powders $Fe_{3-x}Mn_{x-3\delta/4}O_{4+\delta}$", Journal of Solid State Chemistry, 1999, vol. 146, pp. 245-252.

Guillemet-Fritsch, "Thermochemistry of iron manganese oxide spinels", Journal of Solid State Chemistry, 2005, vol. 178, pp. 106-113.

Huang, "Removal of NO by reversible adsorption on Fe—Mn based transition metal oxides", Langmuir, 2001, vol. 17, No. 16, pp. 4997-5003.

Hutchings, "Effect of iron manganese oxide solid solutions on selectivity for lower hydrocarbons from carbon monoxide hydrogenation", Journal of Catalysis, 1986, vol. 100, pp. 507-511.

Lamb, "The Removal of Carbon Monoxide from Air", Journal of Industrial & Engineering Chemistry, Mar. 1920, vol. 12, No. 3, pp. 213-221.

Lambert, "Synthesis and characterization of bimetallic Fe/Mn oxides for chemical looping combustion", Energy Procedia, 2009, vol. 1, pp. 375-381.

Moon, "Hydrothermal synthesis of Fe-substituted manganese dioxide and its electrochemical characterization for lithium rechargeable batteries", Electrochimica Acta, 2014, vol. 134, pp. 92-99.

Njagi, "Total oxidation of CO at ambient temperature using copper manganese oxide catalysts prepared by a redox method", Applied Catalysis B: Environmental, Aug. 2010, vol. 99, No. 1, pp. 103-110.

(56) References Cited

OTHER PUBLICATIONS

Patrice, "Structural and Electrochemical Properties of Newly Synthesized Fe-Substituted $MnO_2$ Samples", Chemistry of Materials, 2004, vol. 16, No. 14, pp. 2772-2782.
Ren, "Desulfurization performance of iron-manganese-based sorbent for hot coal gas", Frontiers of Chemical Engineering in China, Dec. 2010, vol. 4, No. 4, pp. 429-434.
Shu, "Room-temperature catalytic removal of low-concentration NO over mesoporous Fe—Mn binary oxide synthesized using a template-free approach", Applied Catalysis B: Environmental, Aug.-Sep. 2013, vol. 140-141, pp. 42-50.
Stengl, "Mesoporous iron-manganese oxides for sulphur mustard and soman degradation", Materials Research Bulletin, 2012, vol. 47, pp. 4291-4299.
Suib, "Porous Manganese Oxide Octahedral Molecular Sieves and Octahedral Layered Materials", Accounts of Chemical Research, Apr. 2008, vol. 41, No. 4, pp. 479-487.
Suib, "Structure, porosity, and redox in porous manganese oxide octahedral layer and molecular sieve materials", Journal of Materials Chemistry, 2008, vol. 18, pp. 1623-1631.
Szlachta, "Adsorption of arsenite and selenite using an inorganic ion exchanger based on Fe—Mn hydrous oxide", Journal of Colloid and Interface Science, Jan. 2012, vol. 365, No. 1, pp. 213-221.
Szlachta, "The application of Fe—Mn hydrous oxides based adsorbent for removing selenium species from water", Chemical Engineering Journal, Feb. 2013, vol. 217, pp. 159-168.
Tang, "Oxalate route for promoting activity of manganese oxide catalysts in total VOCs' oxidation: effect of calcination temperature and preparation method", Journal of Materials Chemistry A, 2014, vol. 2, pp. 2544-2554.
Vasconcellos, "Iron doped manganese oxide octahedral molecular sieve as potential catalyst for $SO_x$ removal at FCC", Applied Catalysis A: General, 2015, vol. 498, pp. 69-75, XP002762911.
Xiao, "Synthesis of high active-site density nanofibrous MnO2-base materials with enhanced permeabilities", Nanostructured Materials, Aug. 1998, vol. 10, No. 6, pp. 1051-1061.
Yin, "Effects of Fe doping on the structures and properties of hexagonal birnessites—Comparison with Co and Ni doping", Geochimica et Cosmochimica Acta, 2013, vol. 117, pp. 1-15.
Yoo, "Effects of vanadium- and iron-doping on crystal morphology and electrochemical properties of 1D nanostructured manganese oxides", Journal of Power Sources, Dec. 2008, vol. 185, No. 2, pp. 1374-1379.
Yu, "A Simple Template-Free Strategy to Synthesize Nanoporous Manganese and Nickel Oxides with Narrow Pore Size Distribution, and Their Electrochemical Properties", Advanced Functional Materials, May 2008, vol. 18, No. 10, pp. 1544-1554.
Yuan, "Comparison of nano-$MnO_2$ derived from different manganese sources and influence of active material weight ratio on performance of nano-$MnO_2$/activated carbon supercapacitor", Energy Conversion and Management, 2010, vol. 51, pp. 2588-2594.
Yuan, "Textural and capacitive characteristics of $MnO_2$ nanocrystals derived from a novel solid-reaction route", Electrochimica Acta, Jan. 2009, vol. 54, No. 3, pp. 1021-1026.
Yuping, "Morphology-controlled synthesis and novel microwave electromagnetic properties of hollow urchin-like chain Fe-doped $MnO_2$ under 10 T high magnetic field", Journal of Solid State Chemistry, 2011, vol. 184, pp. 1165-1171.
International Search Report for PCT International Application No. PCT/US2016/045514, dated Jan. 26, 2017, 8 pages.

\* cited by examiner

FILTER MEDIA FOR RESPIRATORY PROTECTION

CROSS REFERENCE TO RELATED APPLICATIONS

This application is a national stage filing under 35 U.S.C. 371 of PCT/US2017/024116, filed Aug. 4, 2016, which claims the benefit of Provisional Application No. 62/201,691, filed Aug. 6, 2015, the disclosure of which is incorporated by reference in its/their entirety herein.

BACKGROUND

Sorbents used in respiratory filter cartridges are typically based upon activated carbon. An attribute of activated carbon is its high surface area and ability to adsorb organic vapors. Activated carbons generally only poorly adsorb low boiling point polar compounds such as ammonia, and therefore additional materials are added to the surface to remove these contaminants by chemical reaction.

To filter hazardous gases, such as acidic gases, ammonia, cyanides, or aldehydes, specific chemicals are added to the activated carbon in a process known as impregnation. For example, the Lewis acid transition metal salt zinc chloride is added to carbon to produce a sorbent for ammonia removal. Impregnation of any support (such as activated carbon) involves a balance of loading a sufficient amount of the reactive impregnant without destroying the high surface area of the support.

When considering impregnant materials as sorbent components, factors such as toxicity, stability under relevant conditions, and reactivity represent key attributes. Traditional carbon impregnant based upon copper and zinc are often oxides in the 2+ oxidation state, formed via thermolysis (at ca. 180-200° C.) of activated carbons treated with Cu and/or Zn salts that are soluble in aqueous or ammoniacal solutions. However, when these inorganic oxides are not supported on materials such as activated carbon, each commonly suffer from low porosity and surface area.

SUMMARY

The present disclosure relates to filter media for respiratory protection. In particular the filter media is a manganese oxide material such as an iron-doped manganese oxide material that is capable of removing hazardous gases from a respiratory airstream. The iron-doped manganese oxide material may be prepared using either a low temperature aqueous redox co-precipitation method or an oxalate thermolysis method.

In one aspect, a respiratory protection filter includes a housing having an air stream inlet and an air stream outlet and containing an amount of filtration media in fluid connection and between the air stream inlet and the air stream outlet. The filtration media includes iron-doped manganese oxide material having an average pore size (BJH method) in a range from 1 to 4 nm and a surface area (BET) of at least 300 $m^2/g$, or at least 350 $m^2/g$, or at least 400 $m^2/g$.

In a further aspect, a method of forming an iron-doped manganese oxide material includes combining an iron (III) salt with manganese (II) salt in water to form an aqueous salt mixture and blending a permanganate solution with the aqueous salt mixture to form a wet precipitate. Then the method includes isolating and drying the precipitate to form an iron-doped manganese oxide material.

In a further aspect, a method of forming an iron-doped manganese oxide material includes combining an iron (II) salt with manganese (II) salt in water to form an aqueous salt mixture. Forming an ammonium oxalate solution with a pH in a range from 7 to 8 is followed by blending the ammonium oxalate solution with the aqueous salt mixture to form a wet Fe/Mn oxalate precipitate. Then the method includes drying the wet Fe/Mn oxalate precipitate to remove water and form a dry Fe/Mn oxalate precipitate and then heating the dry Fe/Mn oxalate precipitate at a temperature in range from 200 to 250 degrees Celsius to form an iron-doped manganese oxide material.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that may vary depending upon the properties desired by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The present disclosure relates to filter media for respiratory protection. Like activated carbons, transition metal oxides may have high surface area and porosity, and may be doped with other transition metals to potentially enhance adsorption of hazardous gases. In particular the filter media in the present disclosure is a manganese oxide material such as an iron-doped manganese oxide material that is capable of removing hazardous gases from a respiratory airstream. The manganese oxide material such as an iron-doped manganese oxide material has an average pore size in a range from 1 to 4 nm (BJH method) and a surface area of at least 300 $m^2/g$, or at least 350 $m^2/g$, or at least 400 $m^2/g$ (BET method). The iron-doped manganese oxide material may be prepared using either a low temperature aqueous redox co-precipitation method or an oxalate thermolysis method. The iron-doped manganese oxide material is granulated to a mesh size in a range from 12 to 50 U.S. standard sieve series. The iron-doped manganese oxide material may then be disposed in a respiratory protection filter element. While the present disclosure is not so limited, an appreciation of various aspects of the disclosure will be gained through a discussion of the examples provided below.

Figure 1:
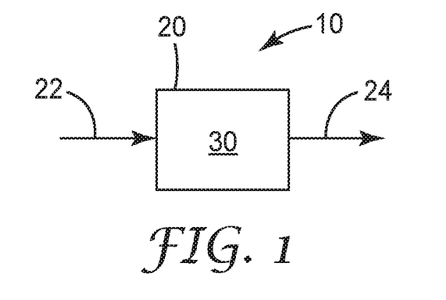
FIG. 1 is a schematic drawing of an illustrative respiratory protection filter.

FIG. 1 is a schematic drawing of an illustrative respiratory protection filter 10. The respiratory protection filter 10 includes a housing 20 having an air stream inlet 22 and an air stream outlet 24 and containing an amount of filtration media 30 in fluid connection and between the air stream inlet 22 and the air stream outlet 24. The filtration media 30 includes iron-doped manganese oxide material.

The filtration media 30 may include one or more additional types of filtration material, such as, activated carbon, for example. In many embodiments the filtration media 30 includes free-standing granular iron-doped manganese oxide material. The filtration media 30 may include at least 20% wt, or at least 30% wt, or at least 50% wt free-standing granular iron-doped manganese oxide material.

The filtration media 30 may include iron-doped manganese oxide material described herein or manganese oxide material or a combination of iron-doped manganese oxide material and manganese oxide material.

The iron-doped manganese oxide material or manganese oxide material is capable of removing one or more hazardous gas from an air stream passing through the filtration media 30 at ambient conditions or atmospheric pressure and −20 to 40 degrees Celsius and 5% to 95% relative humidity. These hazardous gases include examples from acidic or basic gas groups, such as sulfur dioxide, ammonia, and formaldehyde vapour.

The iron-doped manganese oxide material or manganese oxide material described herein has an average pore size (BJH method) in a range from 1 to 4 nm, or 1 to 3.5 nm, or 1 to 3.0 nm and a surface area (BET) of at least 300 $m^2/g$, or at least 350 $m^2/g$, or at least 400 $m^2/g$. The iron-doped manganese oxide material is prepared from chemical reactions with a molar ratio of manganese:iron in a range from 95:5 to 70:30, or preferably in a range from 85:15 to 80:20.

In many embodiments, the iron-doped manganese oxide material or manganese oxide material is granulated to define granules having a mesh size in a range from 12 to 50, or from 20 to 40 U.S. standard sieve series. Any useful granulation process may be utilized. In many embodiments, the granules are formed with compression and without the use of a binder. In many embodiments, the iron-doped manganese oxide granules or manganese oxide granules have a moisture content of less than 10% wt, or less than 5% wt.

In many embodiments, the iron-doped manganese oxide material particles or granules or manganese oxide material particles or granules may have an apparent or bulk density of less than 1.3 g/mL, or less than 1 g/mL, or less than 0.8 g/mL, or less than 0.7 g/mL.

Figure 2:
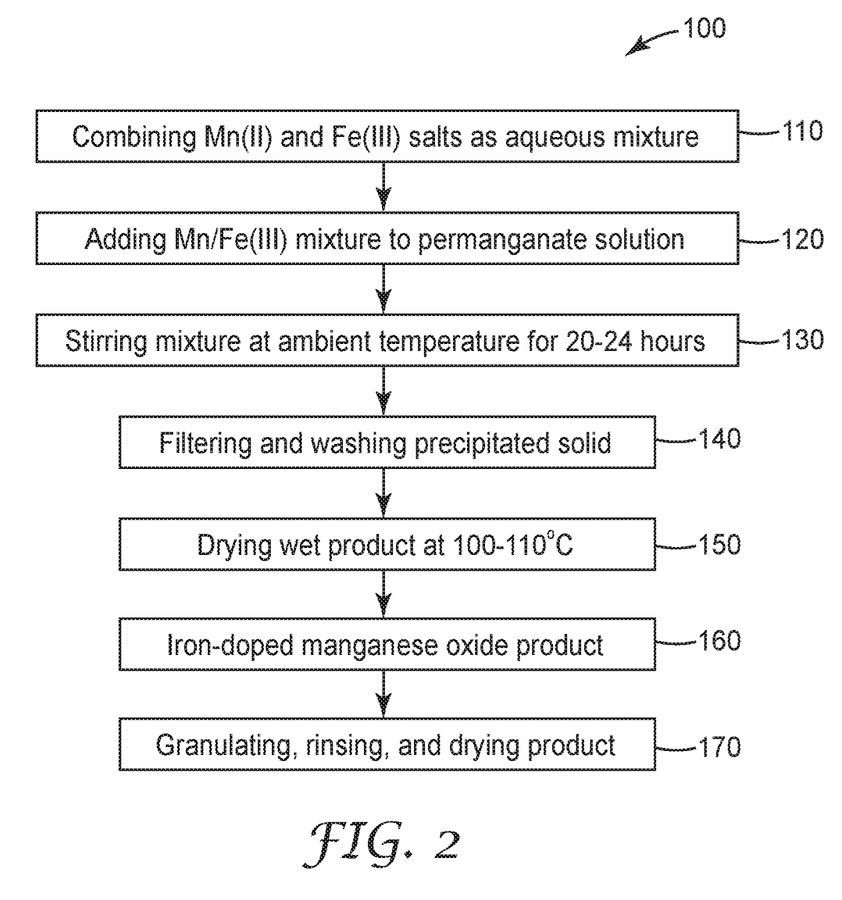
FIG. 2 is a flow diagram of an illustrative method.

FIG. 2 is a flow diagram of an illustrative method 100. This illustrative method is a low temperature aqueous redox co-precipitation method. The method 100 forms an iron-doped manganese oxide material. The method includes combining an iron (III) salt with manganese (II) salt in water to form an aqueous salt mixture (step 110) and blending a permanganate solution with the aqueous salt mixture (step 120) to form a wet precipitate. Then the method includes isolating and drying the precipitate (steps 140 and 150) to form an iron-doped manganese oxide material (step 160).

The blended permanganate solution with the aqueous salt mixture may be stirred or agitated at an ambient temperature for a set period of time (step 130). The set period of time may be any useful time duration. In many embodiments the set period of time is at least a few hours to 48 hours or from 10 hours to 30 hours or from 20 to 24 hours. Isolating the precipitate (steps 140) may include any useful isolation technique to separate a solid from a liquid, such as, filtration, centrifuging and washing, for example.

Drying the precipitate (step 150) occurs at a relatively low temperature to remove water from the precipitate. The drying step 150 may raise the temperature of the precipitate or air surrounding the precipitate to a temperature at or above 100 degrees Celsius but less than 150 degrees Celsius, or less than 125 degrees Celsius, or no greater than 120 degrees Celsius, or no greater than 115 degrees Celsius, or in a range from 100 to 110 degrees Celsius. In many embodiments the method 100 has a processing temperature for all the steps that is no greater than 115 degrees Celsius, or no greater than 110 degrees Celsius. In many embodiments, the drying steps 130, 150 remove only water or moisture from the wet iron-doped manganese oxide material.

In many embodiments, the method 100 occurs at a temperature of less than 125 degrees Celsius, or less than 120 degrees Celsius, or less than 115 degrees Celsius. In particular the blending a permanganate solution with the aqueous salt mixture (step 120) and stirring the mixture step 130 occurs at ambient temperatures such as from 20 to 30 degrees Celsius.

The method may include combining a hydrated iron (III) salt with the manganese (II) salt in water to form an aqueous salt mixture (step 110). In many embodiments the manganese (II) salt is a hydrated manganese (II) salt. Illustrative salts include nitrate, acetate, sulfate and the like. Examples of hydrated manganese (II) salt include manganese (II) acetate tetrahydrate and manganese (II) sulfate monohydrate. Examples of hydrated iron (III) salt include iron (III) nitrate nonahydrate and iron (III) sulfate pentahydrate.

The combining step may include combining a molar ratio of manganese (II) salt:iron (III) salt in a range from 95:5 to 70:30, or preferably in a range from 80:20 to 85:15. In many embodiments, the method 100 may further include granulating or compressing the iron-doped manganese oxide material into granules (step 170) having a mesh size in a range from 12 to 50, or from 20 to 40 U.S. standard sieve series. The iron-doped manganese oxide granules may then be placed into a respiratory protection filter.

Figure 3:
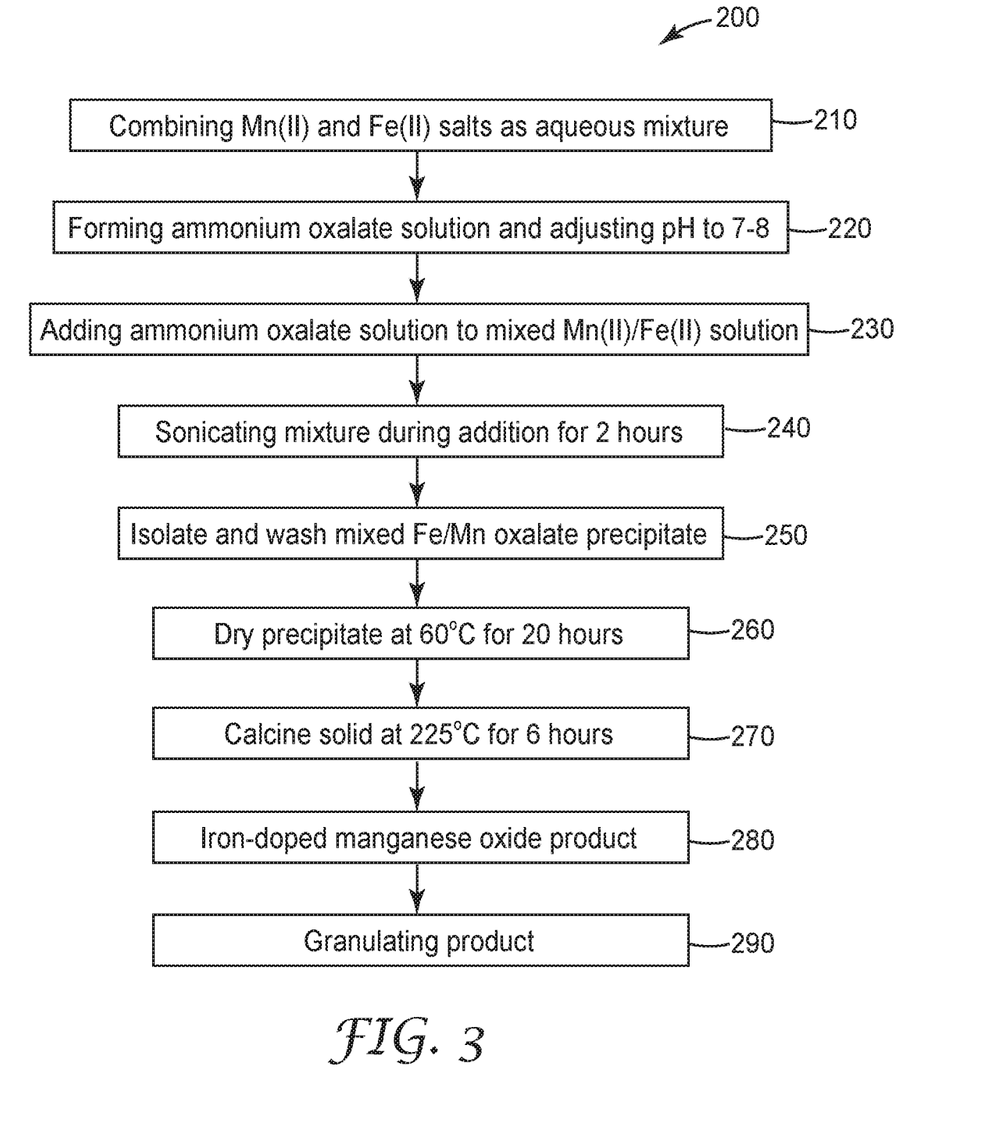
FIG. 3 is a flow diagram of another illustrative method.

FIG. 3 is a flow diagram of an illustrative method 200 of forming an iron-doped manganese oxide material. The illustrated method is an oxalate thermolysis method. The method 200 includes combining an iron (II) salt with manganese (II) salt in water to form an aqueous salt mixture (step 210). Then forming an ammonium oxalate solution with a pH in a range from 7 to 8 (step 220), and blending the ammonium oxalate solution with the aqueous salt mixture (step 230) to form a wet Fe/Mn oxalate precipitate. Then the method includes drying the wet Fe/Mn oxalate precipitate (step 250) to remove water and form a dry Fe/Mn oxalate precipitate (step 260), and then heating the dry Fe/Mn oxalate precipitate at a temperature in range from 200 to 250 degrees Celsius (step 270) to form an iron-doped manganese oxide material (step 280).

After the ammonium oxalate solution is blended with the aqueous salt mixture (step 230), the blended mixture may be sonicated (ultrasonic agitation). Ultrasonic agitation (step 240) may provide a number of surprising advantages such as providing a comparatively smaller particle size and narrower particle size distribution, among others. In some embodiments, ultrasonic agitation may not be performed.

The blended solution aqueous salt mixture (step 230) may be agitated, such as magnetic stirring for example, (step 240) at an ambient temperature for a set period of time. The set period of time may be any useful time duration. In many embodiments the set period of time is at least 30 minutes to 4 hours, or from 1 hour to 3 hours, or about 2 hours. Isolating the precipitate (steps 250) may include any useful isolation technique to separate a solid from a liquid, such as, filtration, centrifuging and washing, for example.

Drying the precipitate (step 260) occurs at a relatively low temperature to remove water from the precipitate. The drying step 260 may raise the temperature of the precipitate or gas surrounding the precipitate to a temperature at or above 40 degrees Celsius but less than 100 degrees Celsius, or in a range from 40 to 80 degrees Celsius, or about 60 degrees Celsius. The dry precipitate may have a moisture content of less than 30%, or less than 25%, or less than 20% by weight.

The dry precipitate (from step 260) is then calcined at a low temperature sufficient to remove carbon dioxide and water. The calcining temperature is from 200 to 250 degrees Celsius, or from 220 to 240 degrees Celsius, or about 225 degrees Celsius for a set period of time is at least 1 hour to 12 hours, or from 3 hour to 8 hours, or about 6 hours. In some embodiments the drying step 260 and the calcining step 270 may be combined into a single calcining step 270 as described above.

The iron-doped manganese oxide material (step 280) may have a uniform size that ranges from 100 to 500 nm, or from 200 to 300 nm.

The method 200 may include combining a hydrated iron (II) salt with the manganese (II) salt in water to form an aqueous salt mixture (step 210). In many embodiments the manganese (II) salt is a hydrated manganese (II) salt. Illustrative salts include nitrate, acetate, sulfate and the like. Examples of hydrated iron (II) salt include iron (II) sulfate heptahydrate. Examples of hydrated manganese (II) salt include manganese (II) acetate tetrahydrate and manganese (II) sulfate monohydrate.

The combining step may include combining a molar ratio of (manganese (II) salt):(iron (II) salt) in a range from 95:5 to 70:30, or preferably in a range from 80:20 to 85:15. In many embodiments, the method 200 may further include granulating or compressing the iron-doped manganese oxide material into granules (step 290) having a mesh size in a range from 12 to 50, or from 20 to 40 U.S. standard sieve series, for example. The iron-doped manganese oxide granules may then be placed into a respiratory protection filter.

Objects and advantages of this disclosure are further illustrated by the following examples, but the particular materials and amounts thereof recited in these examples, as well as other conditions and details, should not be construed to unduly limit this disclosure.

Examples

All parts, percentages, ratios, etc. in the examples are by weight, unless noted otherwise. Solvents and other reagents used are obtained from Sigma-Aldrich Corp., St. Louis, Mo. unless specified differently.

Material Listing

TABLE 1

Material Listing

| Chemical Name | Supplier |
|---|---|
| Manganese (II) acetate tetrahydrate | Sigma-Aldrich |
| Manganese (II) sulfate monohydrate | Alfa Aesar |
| Potassium permanganate | Fisher Scientific |
| Zinc nitrate hexahydrate | Sigma-Aldrich |
| Copper (II) nitrate hemi(pentahydrate) | Sigma-Aldrich |
| Copper (II) sulfate pentahydrate | Anachemia |
| Paraformaldehyde | TDI Chemicals |
| Iron (III) nitrate nonahydrate | Sigma-Aldrich |
| Iron (II) sulfate heptahydrate | Alfa Aesar |
| Ammonium oxalate monohydrate | Alfa Aesar |
| Ammonium hydroxide | BDH |

Preparative Procedures for Method 1: Examples 1-5

Doped manganese oxide samples are named according to the molar ratio of metals in the complete reaction mixture. For example, 80Mn20FeOx refers to a material obtained from a reaction mixture that contained a 4:1 molar ratio of Mn-containing reagents to Fe-containing reagents.

Preparations were modular in that the proportions of $KMnO_4$ and $Mn(O_2CCH_3)_2 \cdot 4H_2O$ remained constant, but the molar amount of iron added to the reaction mixture was changed.

Example 1 is 100:0 Mn:Fe
Example 2 is 90:10 Mn:Fe
Example 3 is 85:15 Mn:Fe
Example 4 is 80:20 Mn:Fe
Example 5 is 75:25 Mn:Fe.

Described below is a representative procedure for the preparation of Example 3: In a 2 L Erlenmeyer flask, $KMnO_4$ (19.0 g, 0.12 mol) was treated with 200 mL of deionized water and the mixture was stirred magnetically. In a separate beaker, $Mn(O_2CCH_3)_2 \cdot 4H_2O$ (44.1 g, 0.18 mol) was dissolved in 100 mL of deionized water. To this pink solution was added $Fe(NO_3)_3 \cdot 9H_2O$ (30.3 g, 0.075 mol), which produced a brown solution. This solution was then added to the Erlenmeyer flask containing permanganate, the first 50 mL via Pasteur pipette, followed by a slow pour for the remaining 50 mL. The mixture was observed to thicken and stirring became impeded, so 200 mL of deionized water was added to resume efficient stirring. The solution was then left to stir magnetically for 22 hours. The dark precipitate was then isolated by vacuum filtration, and washed with 300 mL deionized water in 4 portions. The washed solid was then transferred to a pyrex dish for drying at 100° C. for 20 hours. After this time, the solid was broken up to smaller pieces with the use of a spatula, and then dried again at 110°

C. for 1.5 hours or until the moisture content was <5 wt %. The dried solid was then crushed with a mortar and pestle and sized to 20×40 U.S. Standard Sieve Series granules. The remaining fines were then formed into pellets using a 13 mm die and Carver press using a pressure of 70000 PSI. The pellets were then crushed and sized to 20×40 U.S. Standard Sieve Series granules. Granules were washed a second time with deionized water (150 mL in 4 portions) and dried at 100° C. for 3 hours. Example 4-Cu and 4-Zn were prepared as above using $Cu(NO_3)_2 \cdot 2.5H_2O$ or $Zn(NO_3)_2 \cdot 6H_2O$ in place of $Fe(NO_3)_3 \cdot 9H_2O$.

Preparative Procedures for Method 2: Examples 6-8

$MnSO_4/FeSO_4$ mixed solutions (0.25M) were prepared by dissolving $MnSO_4 \cdot H_2O$ and $FeSO_4 \cdot 7H_2O$ in molar Mn:Fe ratios of:
Example 6 is 100:0 Mn:Fe
Example 7 is 90:10 Mn:Fe
Example 8 is 80:20 Mn:Fe
in 400 mL deionized water. $(NH_4)_2C_2O_4$ solution (0.25M) was prepared by dissolving 14.2 g $(NH_4)_2C_2O_4 \cdot H_2O$ (Alfa Aesar) in 400 mL deionized water. The pH of the $(NH_4)_2C_2O_4$ solution was adjusted to between 7~8 using 8% (vol.) $NH_3 \cdot H_2O$. Using a Masterflex peristaltic pump, the resulting $(NH_4)_2C_2O_4$ solution was added slowly to the $MnSO_4/FeSO_4$ solution over a period of 2 hours while mild sonication (Branson Sonifier 450, 20W) was applied. Precipitated solids were observed to form during the 2 hour time period. After the complete addition of the $(NH_4)_2C_2O_4$ solution, the precipitate was isolated by centrifugation and washed with deionized water repeatedly until the pH reached ~7. The product was then dried overnight in an oven at 60° C. in air. The dried oxalate precipitate was then ground with a mortar and pestle and heated at 225° C. for 6 hours in air to obtain the final powder. The powder was then formed into pellets using a 17 mm die and hydraulic press using a pressure of 8000 PSI. The pellets were then crushed and sized to 20×40 granules. Example 8-Cu was prepared as above using $CuSO_4 \cdot 5H_2O$ in place of $FeSO_4 \cdot 7H_2O$, with another exception that the final heating period was 250° C. for 5 hours.

Test Methods
Tube Testing

A tube testing apparatus was used for breakthrough testing. The sample tubes employed are composed of polyvinylchloride (PVC) (inner diameter=6.5 mm) with a fine stainless steel mesh near the base. These tubes are loaded with a specified volume of filter media granules for testing and are packed to a constant volume by repeatedly tapping the lower end against a hard surface. The sample tube is connected to flexible Teflon tubing using ultra-torr (Swagelok) fittings. Challenge gases of desired concentrations are then delivered through the vertical tube through the top (inlet) portion of the tube at a specified flow rate and the effluent gas that exits the sorbent bed through the lower end of the tube (outlet) is then transported to a detector for analysis.

Sulfur Dioxide Breakthrough Testing:

A sample of filter media granules, either obtained from a commercial vendor or prepared according to a given example, equating to a volume of 1.7 cc was transferred to the tube testing apparatus outlined above and weighed. The filter media granules were tapped until no significant reduction in volume was observed by the human eye. The sample in the tube was then exposed to a test stream of approximately 200 mL/minutes that contained 1000±10% ppm of sulfur dioxide ($SO_2$) in air from a certified gas mixture from Linde (Whitby, ON, Canada). The air downstream from the filter media granules was monitored for breakthrough using either a MIRAN SapphIRe IR portable air analyzer or by pH changes (Fortier et al. *Appl. Surf Sci.* 2007, 253, 3201-3207). The breakthrough time was defined as the time at which a concentration of 20 ppm was observed downstream from the sample.

Ammonia Breakthrough Testing:

A sample of filter media granules, either obtained from a commercial vendor or prepared according to a given example, equating to a volume of 1.7 cc was transferred to the tube testing apparatus outlined above and weighed. The filter media granules were tapped until no significant reduction in volume was observed by the human eye. The sample in the tube was then exposed to a test stream of approximately 200 mL/minutes that contained 1000±10% ppm of ammonia ($NH_3$) in air from a certified gas mixture from Linde (Whitby, ON, Canada). The air downstream from the filter media granules was monitored for breakthrough using either a MIRAN SapphIRe IR portable air analyzer or by pH changes (Fortier et al. *J. Coll. Interf. Sci.* 2008, 320, 423-435). The breakthrough time was defined as the time at which a concentration of 20 ppm was observed downstream from the sample.

Formaldehyde Breakthrough Testing:

The sample tubes employed are composed of glass (inner diameter=9 mm) with an ASTM A glass frit (145-175 µm) near the base. These tubes are loaded to a volume of 0.9 cc of filter media granules for testing. They are packed to a constant volume by repeatedly tapping the lower end against a hard surface. The sample tube is connected to flexible Teflon tubing using ultra-torr (Swagelok) fittings. Formaldehyde of a desired concentration was then delivered through the vertical tube through the top (inlet) portion of the tube at a specified flow rate, and the effluent gas that exits the sorbent bed through the lower end of the tube (outlet) is then transported to a detector. In this case the outlet gas stream was analyzed by an SRI gas chromatograph (GC) using a methanizer to convert carbon dioxide ($CO_2$), and formaldehyde (HCHO) into methane ($CH_4$). A flame ionization detector (FID) was used to detect the methane when it came through at distinct times for $CO_2$ and HCHO. The column in the GC was a 30 m, 0.53 mm inner diameter RT U-Bond (Restek). The sample in the tube was then exposed to a test stream of approximately 250 mL/min of that contained about 250 ppm of HCHO in air from a volatilized sample of paraformaldehyde that was prepared using paraformaldehyde powder. The air downstream to the filter media granules was monitored for breakthrough using the SRI GC. The breakthrough time was defined as the time at which a concentration of 1 ppm was observed downstream to the sample.

Powder X-Ray Diffraction:

Powder X-ray diffraction patterns were collected using a Phillips PW 1720 X-ray generator operated at a voltage of 40 kV and a current of 30 mA. The system is equipped with a Cu Kα radiation source (wavelength=1.54178 Å) and a diffracted beam monochromator. Typical conditions were a scan rate of 0.05°/step and a dwell time of 40 s/step. The samples were ground into fine powder and mounted on an aluminum sample holder.

Surface Area and Pore Size Measurements:

$N_2$ adsorption isotherm and the pore size distribution were determined using a Micromeritics ASAP2010 at 77K. Samples were degassed at 150° C. for 2-3 days before the measurement to remove residual moisture. Pore size distributions were determined using the BJH method (1-300 nm) using software supplied by Micromeritics (ASAP 2010 V5.03 C). The BJH method is a known method and is described at E. P. Barrett, L. G. Joyner, P. H. Halenda, J. Am. Chem. Soc. 73 (1951) 373.

TABLE 2

Selected Characterization Data for Examples 1, 3, 4, 6, and 8.

| Example | Material | Method | Phase by XRD | BET Surface Area (m²/g) | BJH Average Pore Volume (cm³/g) | BJH Pore Size (nm) |
|---|---|---|---|---|---|---|
| 1 | MnOx | 1 | Amorphous MnOx | 214 | 0.23 | 4.4 |
| 3 | 85Mn15FeOx | 1 | Amorphous MnOx | 348 | 0.23 | 3.1 |
| 4 | 80Mn20FeOx | 1 | Amorphous MnOx | 382 | 0.18 | 2.6 |
| 6 | MnOx | 2 | Amorphous MnOx | 451 | 0.29 | 2.3 |
| 8 | 80Mn20FeOx | 2 | Amorphous MnOx | 487 | 0.30 | 2.3 |

The samples of Examples 1-8 were challenged with vapors or gases using the test methods described above. The test results are shown below in Table 3 along with the test results from commercially available Calgon URC, a whetlerite multigas adsorbent prepared by impregnation of activated carbon with copper compounds, molybdenum compounds and salts of sulfuric acid.

TABLE 3

Breakthrough Test Results

| | | | Breakthrough Time (minutes) | | |
|---|---|---|---|---|---|
| Example[1,2,3] | Material | Method | $SO_2$ (±10%) | $NH_3$ (±10%) | HCHO (±10%) |
| | Calgon URC[4] | N/A | 83 | 113 | 306 |
| | Carulite[5] | N/A | 175 | 189 | N[6] |
| 1 | MnOx | 1 | 278 | 190 | 465 |
| 4-Cu | 80Mn20CuOx | 1 | 231 | 277 | N |
| 4-Zn | 80Mn20ZnOx | 1 | 213 | 273 | N |
| 2 | 90Mn10FeOx | 1 | 221 | 203 | N |
| 3 | 85Mn15FeOx | 1 | 365 | 535 | 495 |
| 4 | 80Mn20FeOx | 1 | 358 | 503 | 506 |
| 5 | 75Mn25FeOx | 1 | 289 | 523 | N |
| 6 | MnOx | 2 | 380 | 175 | N |
| 8-Cu | 80Mn20CuOx | 2 | 229 | 130 | N |
| 7 | 90Mn10FeOx | 2 | 340 | 156 | N |
| 8 | 80Mn20FeOx | 2 | 410 | 180 | N |

[1]All filter media granules tested at 20 × 40 mesh size.
[2]Sample volume: 1.7 cc ($SO_2$, $NH_3$); 0.9 cc (HCHO)
[3]Average of 2-3 tests for breakthrough times
[4]Calgon URC (as received), commercially available from Calgon Carbon Company, Pittsburgh, PA, USA.
[5]Carulite (as received, sized to 20 × 40 mesh granules), commercially available from Carus Corporation, Peru, IL, USA.
[6]N signifies test was not undertaken.

Preparative Procedures for Method 2: Examples 9-10

$MnSO_4$/$FeSO_4$ mixed solutions (0.25M) were prepared by dissolving $MnSO_4 \cdot H_2O$ and $FeSO_4 \cdot 7H_2O$ in molar Mn:Fe ratios of:

Example 9 is 80:20 Mn:Fe

Example 10 is 90:10 Mn:Cu

Example 9 was prepared using magnetic stirring with no sonication (ultrasonic mixing). A $MnSO_4$/$FeSO_4$ mixed solution (0.25M) and $(NH_4)_2C_2O_4$ (0.25M) solution were prepared as above. The pH of $(NH_4)_2C_2O_4$ solution was adjusted to ~10 using 8% (vol.) $NH_3 \cdot H_2O$. Using a Masterflex peristaltic pump, the resulting $(NH_4)_2C_2O_4$ solution was added slowly to the $MnSO_4$/$FeSO_4$ solution over a period of 15 hours with vigorous magnetic stirring. After the complete addition of the $(NH_4)_2C_2O_4$ solution, the precipitate was isolated by filtration and washed with deionized water repeatedly until the pH reached ~7. The product was then dried overnight in an oven at 60° C. in air. The dried oxalate precipitate was then ground with a mortar and pestle and heated at 225° C. for 6 hours in air to obtain the final powder. The powder was then formed into pellets using a 17 mm die and hydraulic press using a pressure of 8000 PSI. The pellets were then crushed and sized to 20×40 mesh granules. Example 10 was prepared in the same fashion as Example 9 using $CuSO_4 \cdot 5H_2O$ in place of $FeSO_4 \cdot 7H_2O$, with another exception that the final heating period was 250° C. for 5 hours.

TABLE 4

Selected Characterization Data for Examples 9 and 10.

| Example | Material | Method | Phase by XRD | BET Surface Area (m²/g) | BJH Average Pore Volume (cm³/g) | BJH Pore Size (nm) |
|---|---|---|---|---|---|---|
| 9 | 80Mn20FeOx | 2 | Amorphous MnOx | 445 | N[1] | N |
| 10 | 90Mn10CuOx | 2 | Amorphous MnOx | 434 | N | N |

[1]N signifies analysis was not undertaken.

TABLE 5

Breakthrough Test Results

| Example[1,2,3] | Material | Method | SO$_2$ (±10%) | Breakthrough Time (minutes) NH$_3$ (±10%) | HCHO (±10%) |
|---|---|---|---|---|---|
| 9 | 80Mn20FeOx | 2 | 270 | 146 | N[4] |
| 10 | 90Mn10CuOx | 2 | 295 | 150 | N |

[1]All filter media granules tested at 20 × 40 mesh size.
[2]Sample volume: 1.7 cc (SO$_2$, NH$_3$); 0.9 cc (HCHO)
[3]Average of 2-3 tests for breakthrough times
[4]N signifies test was not undertaken.

Thus, embodiments of FILTER MEDIA FOR RESPIRATORY PROTECTION are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A respiratory protection filter comprising:
    a housing having an air stream inlet and an air stream outlet and containing an amount of filtration media in fluid connection and between the air stream inlet and the air stream outlet, the filtration media comprising:
        iron-doped manganese oxide material having an average pore size in a range from 1 to 4 nm using the Barrett, Joyner, and Halenda (BJH) method and a surface area of at least 300 m$^2$/g using the Brunauer, Emmett, and Teller (BET) method.

2. The respiratory protection filter according to claim 1, wherein the iron-doped manganese oxide material is capable of removing a hazardous gas from an air stream passing through the filtration media at atmospheric pressure −20 to 40 degrees Celsius, and 5% to 95% relative humidity.

3. The respiratory protection filter according to claim 1, wherein the iron-doped manganese oxide material is produced from a chemical reaction that has a molar ratio of manganese:iron in a range from 95:5 to 70:30.

4. The respiratory protection filter according to claim 1, wherein the iron-doped manganese oxide material defines granules having a mesh size in a range from 12 to 50 U.S. standard sieve series.

5. The respiratory protection filter according to claim 1, wherein the iron-doped manganese oxide material has an apparent or bulk density of less than 1.3 g/mL.

6. The respiratory protection filter according to claim 1, wherein the iron-doped manganese oxide material is in a form of compression derived granules.

7. The respiratory protection filter according to claim 1, wherein the iron-doped manganese oxide material has an average pore size in a range from 1 to 3 nm using the BJH method and a surface area of at least 350 m$^2$/g using the BET method.

8. The respiratory protection filter according to claim 1, wherein the iron-doped manganese oxide material has an average pore size in a range from 1 to 3 nm using the BJH method and a surface area of at least 400 m$^2$/g using the BET method.

9. The respiratory protection filter according to claim 1, wherein the iron-doped manganese oxide material is made by:
    combining an iron (III) salt with manganese (II) salt in water to form an aqueous salt mixture;
    blending a permanganate solution with the aqueous salt mixture to form a wet precipitate;
    maintaining a processing temperature of 20 to 30 degrees Celsius; and
    isolating and drying the precipitate to form an iron-doped manganese oxide material, while maintaining a processing temperature of no greater than 115 degrees Celsius during making of the iron-doped manganese oxide material.

10. The respiratory protection filter according to claim 9, wherein the manganese (II) salt and iron (III) salt are combined at a molar ratio of 80:20 to 85:15.

* * * * *

UNITED STATES PATENT AND TRADEMARK OFFICE
CERTIFICATE OF CORRECTION

Page 1 of 1

PATENT NO. : 10,806,954 B2
APPLICATION NO. : 15/749820
DATED : October 20, 2020
INVENTOR(S) : Matthew Rankin It is certified that error appears in the above-identified patent and that said Letters Patent is hereby corrected as shown below:

On the Title Page

Column 1, Item (86) Line 8 (approx.), Delete "PCT/US2017/024116," and insert -- PCT/US2016/045514, --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*